United States Patent
Van Der Wey

[15] 3,667,511
[45] June 6, 1972

[54] DEVICE FOR CRACKING THE SHELLS OF NUTS

[72] Inventor: Anton F. Van Der Wey, 350 Bourbeau Street, Asbestos, Quebec, Canada

[22] Filed: June 1, 1970

[21] Appl. No.: 41,952

[30] Foreign Application Priority Data

Apr. 25, 1969 Canada....................060,391

[52] U.S. Cl............................................146/14
[51] Int. Cl. .........................................A23n 5/02
[58] Field of Search ......................146/13, 14, 15

[56] References Cited

UNITED STATES PATENTS 1,094,698 4/1914 Bostrom ..................................146/15
3,435,863 4/1969 Dye .........................................146/15

Primary Examiner—Willie G. Abercrombie
Attorney—Alan Swabey

[57] ABSTRACT

A device for cracking the shells of edible nuts comprising a body member having a cavity for receiving a nut. An impactor is resiliently connected to the body member. The impactor is manually pulled away from the body member against the force exerted by its resilient connection, and then released, to be projected by the resilient connection against a nut in the cavity.

3 Claims, 2 Drawing Figures

PATENTED JUN 6 1972          3,667,511

*INVENTOR*
Anton F. VAN DER WEY

*Alan Swabey*
ATTORNEY

DEVICE FOR CRACKING THE SHELLS OF NUTS

BACKGROUND OF THE INVENTION

1. Field of the Invention

This invention relates to a manually operable household utensil for opening the shells of edible nuts.

2. Description of the Prior Art

Devices commonly used for opening nuts compress the nut to crack its shell. The nut is inserted between a pair of jaws in the device, which jaws may be carried by hinged levers or by a screw thread. The jaws are then moved together to compress the nut to crack its shell by manual operation of the levers or screw thread. The operator's force is mechanically multiplied by the levers or the screw thread.

However, this compression type of operation to crack the nuts still requires a considerable amount of effort from the operator. In addition, the nut meats can be damaged when the shell is cracked. The devices are also relatively expensive to manufacture.

SUMMARY OF THE INVENTION

It is the purpose of the present invention to provide a device for cracking the shells of edible nuts which is relatively inexpensive to manufacture, requires less effort to operate than known devices, and which reduces the possibility of internally damaging the nut meat when cracking its shell.

The invention relates to a device for cracking the shells of nuts by impact action rather than by compression action. A firm body hitting the shell of a nut at a relatively high velocity will damage the shell locally, with less chance of damaging the nut meat.

The device comprises a body member having a depression or hollow for receiving a nut therein. An impactor, comprising a solid body, is connected to the body member by resilient means. The resilient means supports the impactor substantially centrally with respect to the depression or hollow.

Preferably, the resilient means is connected to the body member at two points to extend across the depression or hollow, the impactor being carried midway along the length of the resilient means.

BRIEF DESCRIPTION OF THE DRAWINGS

The invention will now be described in detail having reference to the accompanying drawings, in which.

DESCRIPTION OF THE PREFERRED EMBODIMENT

Figure 1:
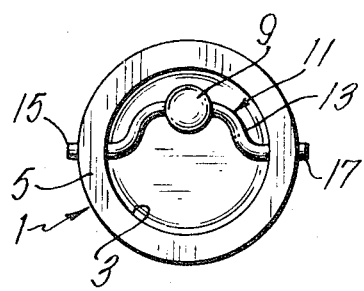
FIG. 1 is a top plan view of one embodiment of the nut cracking device.
Figure 2:
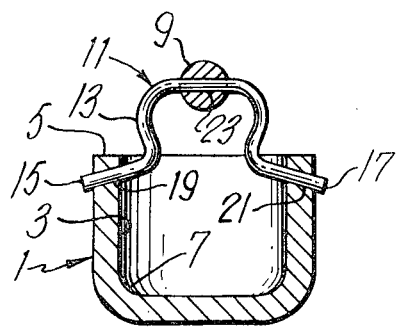
FIG. 2 is a cross-sectional view taken along line 2—2 of FIG. 1.

The device shown in FIGS. 1 and 2 comprises a body member 1 having a depression or cavity 3 therein. The body member 1 shown has a cylindrical shape but can have other shapes, such as square or rectangular, as well. The body member 1 preferably has a planar top surface 5. The depression or cavity 3 extends into the body member 1 from this planar surface 5. As shown, the cavity 3 has a substantially cylindrical shape with a slightly rounded bottom 7. The cavity 3 may have other shapes, such as being semi-spherical. The cavity has a diameter and depth of a size to accommodate most hard-shelled edible nuts.

An impactor 9 is connected to the body member by resilient means 11. The impactor 9 can comprise a firm or dense body of material in the shape of a ball. The impactor 9 can, for example, comprise a steel ball. The ball has a diameter substantially smaller than the diameter of cavity 3. The resilient means 11 can comprise an elastic strip 13 of material attached, at its ends 15, 17, to the body member 1 so as to extend loosely and diametrically across the cavity 3. The ends 15, 17 of the strip 13 can be fixed in bore holes 19, 21 extending outwardly from the cavity wall adjacent surface 5. The impactor 9 has a bore 23 through which the strip 13 is threaded before its connection to the body member to centrally locate the impactor 9 with respect to the cavity 3.

To operate the device, the body member 1 is grasped in one hand, a nut is placed in the cavity 3, the impactor 9 is drawn back, away from the nut with the other hand, against the force exerted by the elastic strip 13, and then released.

The energy stored in the stretched elastic strip drives the impactor against the nut shell to crack the shell.

While the resilient means 11 has been described as comprising an elastic strip 13, it can also comprise a helical wound tension spring.

I claim:

1. A hand-held, manually operable, device for cracking the shells of edible nuts, comprising a containing member having continuous walls defining a space for receiving, substantially within the confines of the member, a nut to be cracked, an opening in a surface of the member providing access to the space, said opening being at least as large as the smallest dimension of a nut to permit the nut to be inserted in the space, a length of resilient means attached at or adjacent its ends to two locations on the walls of the member adjacent the opening, said attaching locations positioned so an imaginary line joining the two attaching locations substantially bisects the opening, and an impactor on the resilient means for cracking the shell of the nut, the impactor located substantially midway along the length of the resilient means between its attachment locations to the wall.

2. A device as claimed in claim 1, wherein the impactor comprises a hard ball member fixedly mounted on the resilient means.

3. A device as claimed in claim 1, wherein the length of resilient means comprises an elastic band.

* * * * *